(12) United States Patent
Bin et al.

(10) Patent No.: US 12,210,640 B1
(45) Date of Patent: Jan. 28, 2025

(54) SYSTEM, METHOD, AND COMPUTER PROGRAM FOR MANAGING SENSITIVE LOCAL DATA FOR A GLOBAL APPLICATION IN COMPLIANCE WITH LOCAL DATA RESIDENCY REQUIREMENTS

(71) Applicant: Odaseva Technologies SAS, Neuilly-sur-Seine (FR)

(72) Inventors: Sovane Bin, San Francisco, CA (US); Saddek Dekoum, Ris Orangis (FR); Francois Lopitaux, San Carlos, CA (US); Remi Poujeaux, Rueil-Malmaison (FR); Arnaud Deronne, Castelnau le lez (FR)

(73) Assignee: Odaseva Technologies SAS, Neuilly-sur-seine (FR)

( * ) Notice: Subject to any disclaimer, the term of this patent is extended or adjusted under 35 U.S.C. 154(b) by 436 days.

(21) Appl. No.: 17/743,344

(22) Filed: May 12, 2022

(51) Int. Cl.
*G06F 21/62* (2013.01)

(52) U.S. Cl.
CPC .............................. *G06F 21/6218* (2013.01)

(58) Field of Classification Search
CPC ................................................ G06F 21/6218
USPC .......................................................... 726/26
See application file for complete search history.

(56) References Cited

U.S. PATENT DOCUMENTS

| | | | |
|---|---|---|---|
| 8,775,328 B1 * | 7/2014 | Abhyanker | G06Q 10/087 705/325 |
| 9,288,184 B1 * | 3/2016 | Kvamme | H04L 63/10 |
| 2016/0277374 A1 * | 9/2016 | Reid | H04L 63/0435 |
| 2018/0336209 A1 * | 11/2018 | Burshteyn | H04L 9/0631 |
| 2020/0226953 A1 * | 7/2020 | Anand | G09C 5/00 |
| 2020/0336481 A1 * | 10/2020 | Fan | H04L 9/0869 |
| 2021/0026982 A1 * | 1/2021 | Amarendran | G06F 21/6254 |
| 2021/0365414 A1 * | 11/2021 | Lu | G06F 16/1748 |
| 2021/0365587 A1 * | 11/2021 | Lu | G06F 9/505 |
| 2023/0281305 A1 * | 9/2023 | Savry | G06F 21/556 726/22 |
| 2024/0020414 A1 * | 1/2024 | Burns | G06F 21/602 |
| 2024/0064020 A1 * | 2/2024 | Kiraz | H04L 9/50 |
| 2024/0220656 A1 * | 7/2024 | Nozawa | G06F 21/6245 |

\* cited by examiner

*Primary Examiner* — Jeffrey C Pwu
*Assistant Examiner* — Nega Woldemariam
(74) *Attorney, Agent, or Firm* — Lessani Law Group, PC (57) ABSTRACT

The present invention is directed to managing sensitive local data for a global application in compliance with local data residency requirements. In a first location having data residency requirements, the system receives a write request for a record, determines that the record includes both sensitive and non-sensitive data, stores the sensitive data in a local storage device, creates masked data corresponding to the sensitive data, creates a modified record that includes the masked data, the local storage ID of the sensitive data, and the non-sensitive data, and sends the modified record to a global application for storage in a second location. In the second location, the system receives the write request for the modified record at an enforcement module on the global application, determines whether the modified record complies with the data residency requirements of the first location and, if so, sends the modified record to a global storage device.

10 Claims, 11 Drawing Sheets

SYSTEM, METHOD, AND COMPUTER PROGRAM FOR MANAGING SENSITIVE LOCAL DATA FOR A GLOBAL APPLICATION IN COMPLIANCE WITH LOCAL DATA RESIDENCY REQUIREMENTS

BACKGROUND OF THE INVENTION

1. Field of the Invention

This invention relates generally to cloud-based applications and, more specifically, to a system and method for managing sensitive local data for a global application in compliance with local data residency requirements.

2. Description of the Background Art

Increasingly, more countries are not allowing sensitive data, such as personally identifiable information (e.g., name, physical address, phone number, email address, social security number, etc.), of citizens to leave the country. For example, China is one such country that does not allow sensitive data of its citizens to leave China. Many global enterprises, however, use a global application (e.g., a cloud-based application such as Salesforce). Employees and/or customers of the global enterprises located in different countries use the global application such that data is entered into local clients for the global application and stored centrally in global storage devices. Complying with various data residency requirements while using a global application across different countries is challenging.

The present invention provides a solution to enable enterprises that use global applications to comply with local data residency requirements by extracting the sensitive data that was entered into a client application for the global system and storing the sensitive data locally. The sensitive data is then masked in the record that goes to the global application for storage. As a result, for countries with data residency requirements, the sensitive data does not leave the country.

SUMMARY OF THE DISCLOSURE

The present disclosure describes a system, method, and computer program for managing sensitive local data for a global application in compliance with local data residency requirements. The method is performed by a computer system that includes servers, storage systems, networks, operating systems, and databases.

The present invention provides a system and method for determining whether data received via a client application at a first location includes both sensitive information subject to data residency requirements and non-sensitive information, storing the sensitive information in local storage, creating a masked version of the sensitive data, and sending the masked sensitive information and non-sensitive information to a global application for storage outside the data residency requirements. The present invention also includes an enforcement module that intercepts any write requests being sent to the global application at a second location. The enforcement module determines whether the write request complies with the data residency requirements of the first location and, if so, sends the write request to a global storage device. If the enforcement module determines that the write request does not comply with the data residency requirements of the first location, the enforcement module rejects the write request before it consumes API bandwidth to the global storage, which is a limited and potentially costly resource.

In one embodiment, a method for managing sensitive local data for a global application in compliance with local data residency requirements comprises the following steps:
performing the following in a first location having data residency requirements:
receiving a write request for a record from a user via a client application in the first location;
determining on the client application that the record includes both sensitive data that is subject to the data residency requirements and non-sensitive data;
storing the sensitive data in a local storage device within the first location, wherein the sensitive data is associated with a local storage ID;
creating masked data corresponding to the sensitive data;
creating a modified record that includes the masked data in place of the sensitive data, the local storage ID of the sensitive data, and the non-sensitive data;
sending the modified record to a global application for storage in a global storage device in a second location outside the data residency requirements;
performing the following in the second location:
receiving the write request for the modified record at an enforcement module on the global application;
determining at the enforcement module whether the modified record complies with the data residency requirements of the first location;
in response to determining that the modified record complies with the data residency requirements of the first location, sending the modified record to a global storage device for storage; and
in response to determining that the record does not comply with the data residency requirements of the first location, rejecting the write request.

DETAILED DESCRIPTION OF THE PREFERRED EMBODIMENTS

The present disclosure describes a system, method, and computer program for managing sensitive local data for a global application in compliance with local data residency requirements. The method is performed by a computer system that includes servers, storage systems, networks, operating systems, and databases ("the system").

Example implementations of the methods are described in more detail with respect to FIGS. 1-8B.

1. Overview

Figure 1:
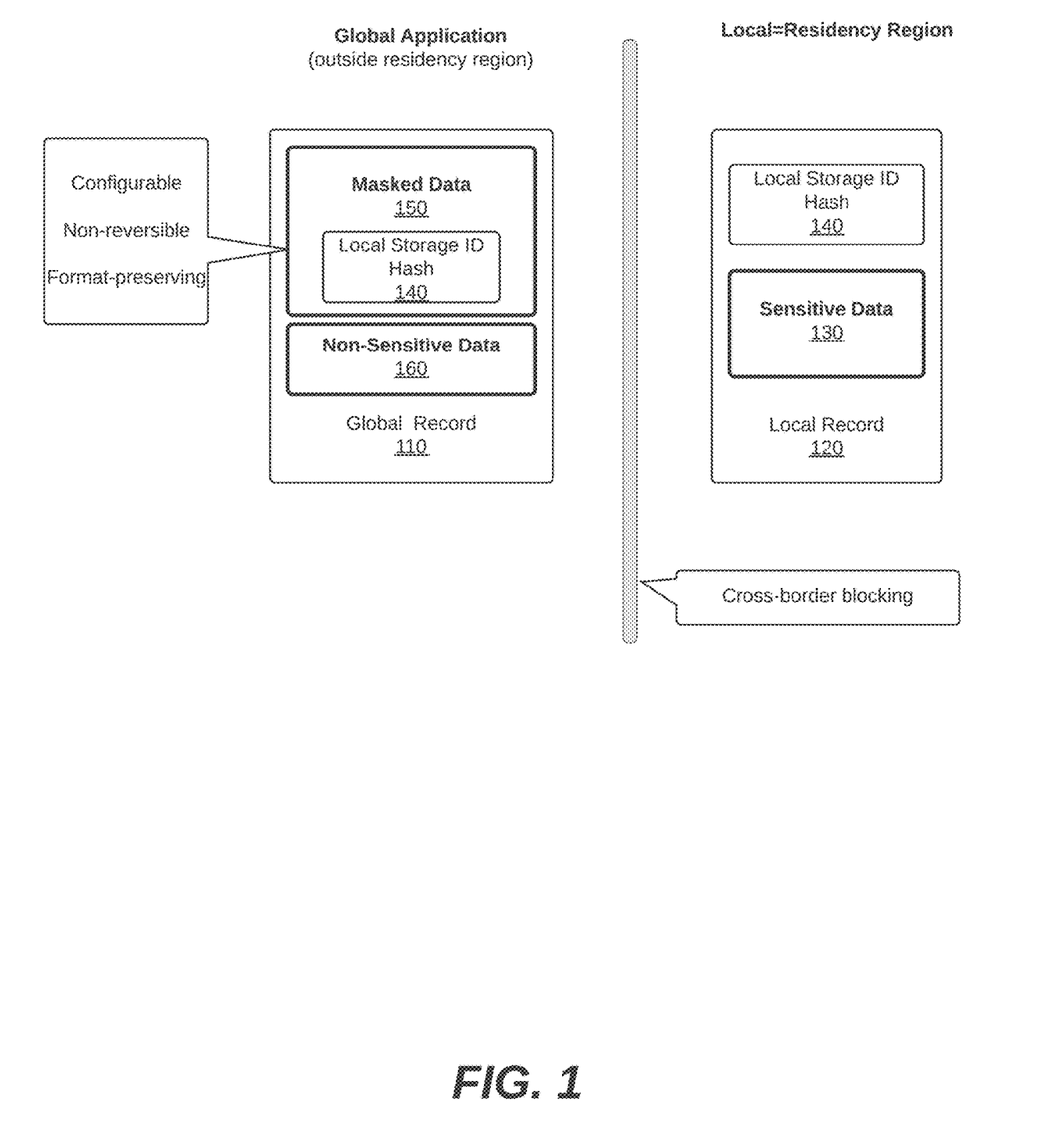
FIG. 1 is a block diagram that illustrates an overview of the present invention, according to one embodiment, in which sensitive data is stored locally and masked outside the residency region.

FIG. 1 illustrates an overview of the present invention in which sensitive data is stored locally and masked outside the residency region. FIG. 1 illustrates a global record 110 within a global application, which is outside the residency region, and a local record 120, which is within the residency region. Sensitive data 130 is stored in the local record 120 along with a local storage ID hash 140. The sensitive data 130 is masked outside the residency region and stored as masked data 150 in the global record 110. The masked data 150 is stored with the local storage ID hash 140 as well as non-sensitive data 160. The masked data 150 is configurable, non-reversible, and format-preserving, and any cross-border transfer of data from the local residency region to outside the residency region is blocked.

In certain embodiments, the global application is a worldwide SaaS system implemented by a customer and hosted outside the customer's residency region (e.g., Salesforce, SAP S/4 Hana, and Workday). The residency region is the region where the residency regulation applies (e.g., China or Russia). Sensitive data is any data that is within the scope of the data residency requirements (e.g., personally identifiable information, or PII, or critical infrastructure, or CI, data). Non-sensitive data is any data that is outside the scope of the data residency requirements (e.g., non-PII). Original data is sensitive data as it was entered into the client application (e.g., original PII data or original CI data). Masked data is an unreadable version of the sensitive data (e.g., masked PII data or masked CI data).

"Local" as used herein means residing within the geographic boundaries of the data residency requirements (i.e., the same data residency requirements to which the client application is subject). For example, if a country has data residency requirements, then, for the purposes of determining sensitive data of users, "local" means residing within the geographic boundaries of the country. As a result, local storage is the storage of data within the residency region (e.g., within the geographic boundaries of the country). Global storage is the storage of data within the global cloud-based application that may be outside the residency region (e.g., outside the geographic boundaries of the country). A local storage ID hash is a unique identifier of a local record that allows it to link to the global application (e.g., RaaS ID or a "token").

In certain embodiments, configurable means that an administrator can configure what is considered sensitive data (e.g., what data object/field combinations have sensitive data), non-reversible means that it is not possible to reverse the masking to reveal the sensitive data, and format-preserving means that masked data retains the same format as the sensitive data (e.g., if a data field is masked, the masked data will comply with the data field format).

In an alternate embodiment, some countries allow sensitive data to leave the country, but require that it first be stored locally. As a result, the present invention may be adapted to first store the sensitive data locally, but it skips the masking step before sending the sensitive data to the global application for storage.

2. Example System Architecture

Figure 2:
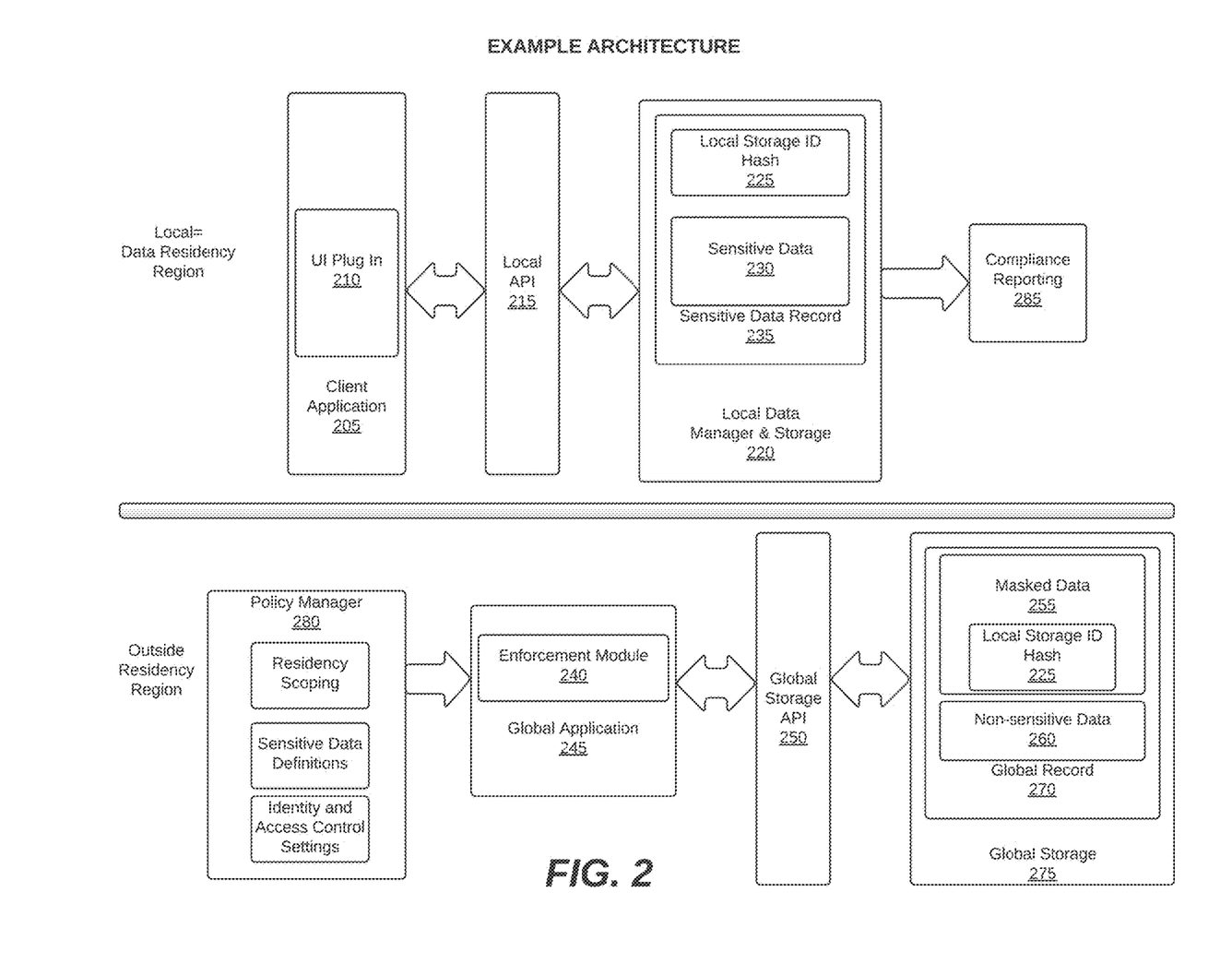
FIG. 2 is a block diagram that illustrates an example system architecture according to one embodiment.

FIG. 2 illustrates an example architecture for a system that performs the methods described herein. However, the methods described herein may be implemented in other systems and are not limited to the illustrated system. Similar to FIG. 1, FIG. 2 illustrates a local data residency region and an outside residency region. The local data residency region includes a client application 205 having a UI plug in 210. In certain embodiments, instead of installing a UI plug in 210, the client code is implemented as being native to the client application 205. In conjunction with the local API 215 and the local data manager 220, the UI plug in 210 provides local enforcement of the data residency policy within the data residency region. Furthermore, in response to the user initiating a read, write, or search request, the UI plug in 210 determines whether sensitive data 230 is involved based on policy definitions received from the local API 215. Furthermore, it initiates writing/retrieval of sensitive data 230 to/from local storage 220 and writing/retrieval of non-sensitive data 260 to/from global storage 275.

The local API 215 interfaces between the UI plug in 210 of the client application 205 and the local data manager 220 and thus provides the client application 205 with a local connection to the local data manager 220 for read, write, and search requests. It also provides the UI plug in 210 with data residency policy definitions, has local end points to ensure data residency compliance, and determines whether the user's IP address is within the residency region.

The local data manager 220 stores the local (sensitive) data 230 together with its local storage ID hash 225 in a sensitive data record 235 on a local infrastructure (local storage) 220 and grants access to the data. The local data manager 220 also creates a masked version of the sensitive data. Whether a user has access to a record 235 may be determined in one of two ways: the global application 245 may manage identity and access control. In such an embodiment, an authorization token is associated with a user profile and indicates the user access permissions. For example, the token may be an authorization token in accordance with the OAuth open-standard authorization protocol. The local data manager 220 may also execute specific access control rules provided by the policy manager 280 to determine user access permissions.

The compliance reporting module 285 enables a user to monitor enforcement of the data residency policy and provides a consistency check between the masked data 255 stored in global storage 275 and the original data 230 stored in local storage 220. For every masked data field in global storage 275, there should be a corresponding sensitive data field in local storage 220 and vice versa.

The policy manager 280 enables an administrator to configure the data residency policy, such as defining the residency scope, the sensitive data definitions, and the identity and access control settings. For example, for a residency region, it enables an administrator to specify what object/field combinations are considered sensitive data 230 in the residency region, how a given record 235 is considered as containing data from the residency region, and how a given user is considered to be in the residency region. As an example of how a given record 235 is considered as containing data from the residency region, in one embodiment, there is a field in the record 235 that specifies the country in which the record was created. Through the policy manager 280, the administrator can specify that the UI plug in 210 and the enforcement module 240 will check this field to identify the location associated with the record 235. As an example of how a given user is considered to be in the residency region, an administrator may specify that a user is considered to be in a particular residency region if: (1) the user profile indicates that the user resides in the region, and/or (2) the IP address of the user is from within the residency region.

Through the policy manager 280, the administrator may also specify certain rules related to the sensitive data 230, such as: validation rules (e.g., check that data in a phone number field complies with the phone number format; same with email and other fields) and how to calculate certain fields derived from sensitive data 230 (e.g., how to calculate a user's age from their birthday such that the age can be seen outside the residency region despite the birthday being masked).

Through the policy manager 280, the administrator may also specify identity and access control settings, such as how identity and access control will be delegated to the global application 245 or specific rules for the local data manager 220 to execute to determine user identity and access permissions. The policy definition configured through the policy manager 280 is distributed to the enforcement module 240, the local API 215, and the local data manager 220.

The enforcement module 240 intercepts write requests from a client application 205 to check its compliance with the data residency policy and block the write request if it contains sensitive data 230 that has not been written to the local data manager 220 and converted into a masked version. In certain embodiments, the enforcement module 240 operates as a plug in and, in other embodiments, it operates as a module running within the global application 245.

The global storage API 250 interfaces between the global application 245 and the global storage 275. The global storage 275 stores global records 270, which include masked data 255 having a local storage ID hash 225, and non-sensitive data 260.

3. Example Write Process for Compliance with Data Residency Requirements

Figure 3:
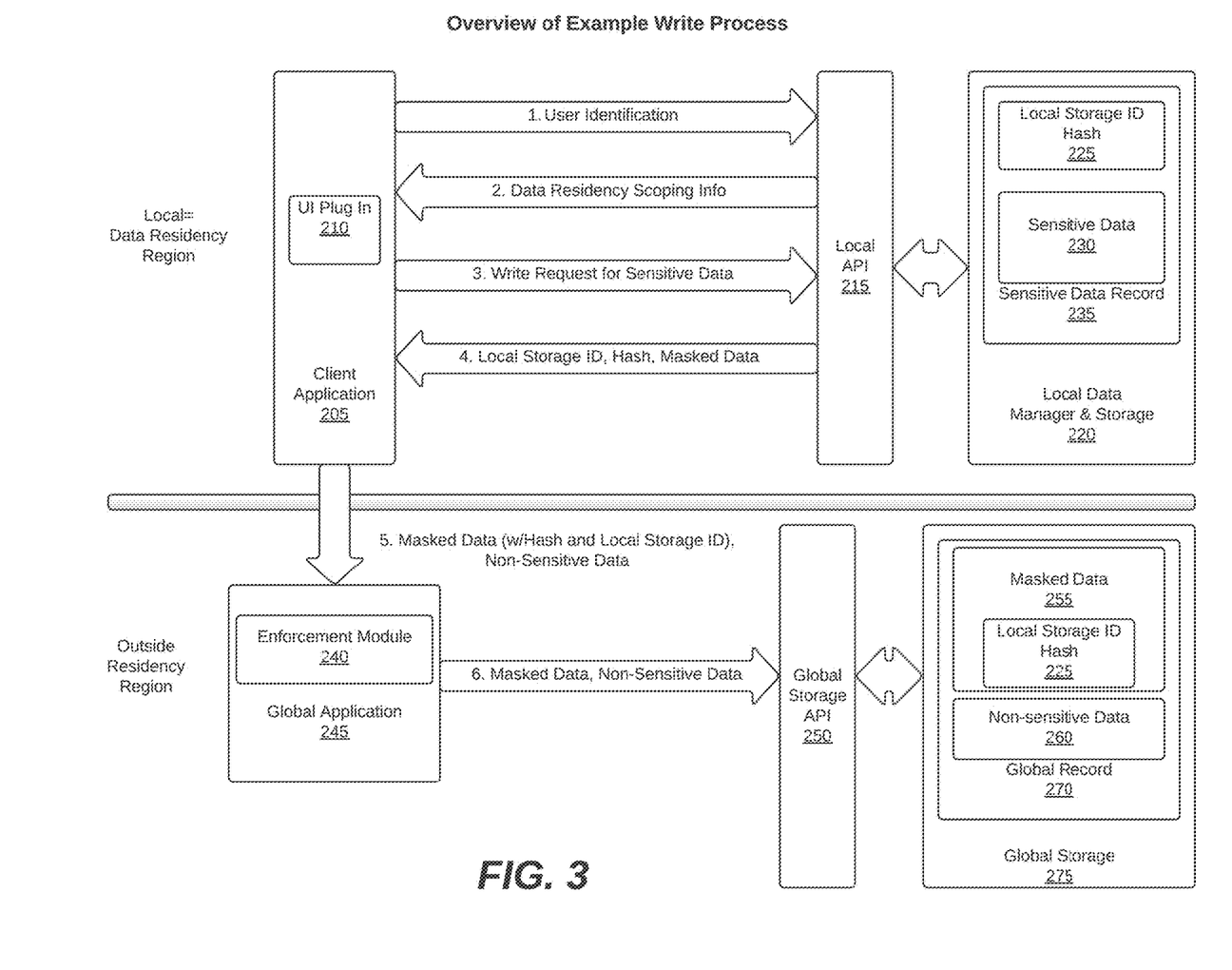
FIG. 3 is a block diagram that illustrates an overview of an example write process according to one embodiment.
Figure 4A:
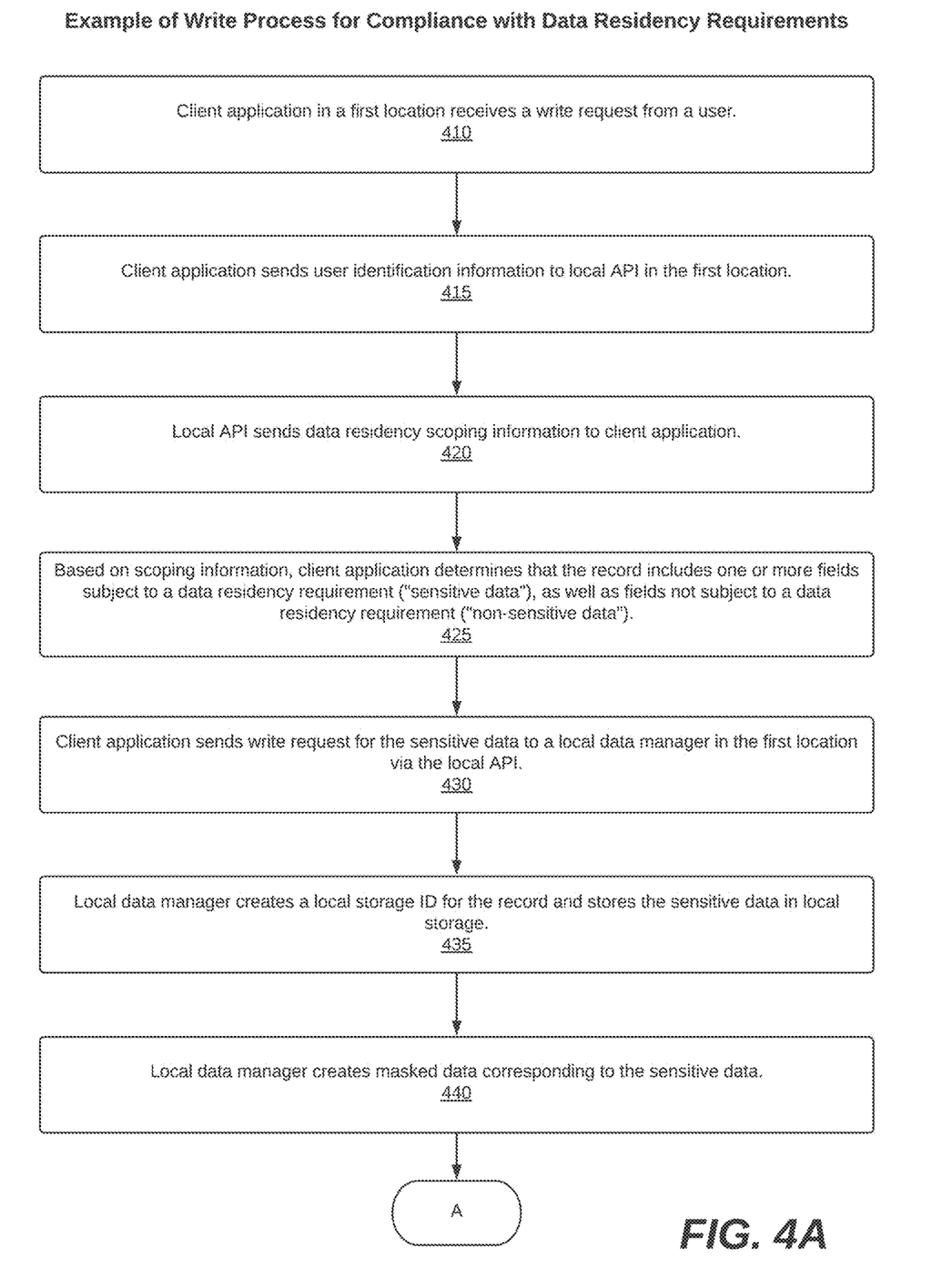
FIGS. 4A-4B are flowcharts that illustrate a method, according to one embodiment, for performing the example write process of FIG. 3 for compliance with data residency requirements.
Figure 4B:
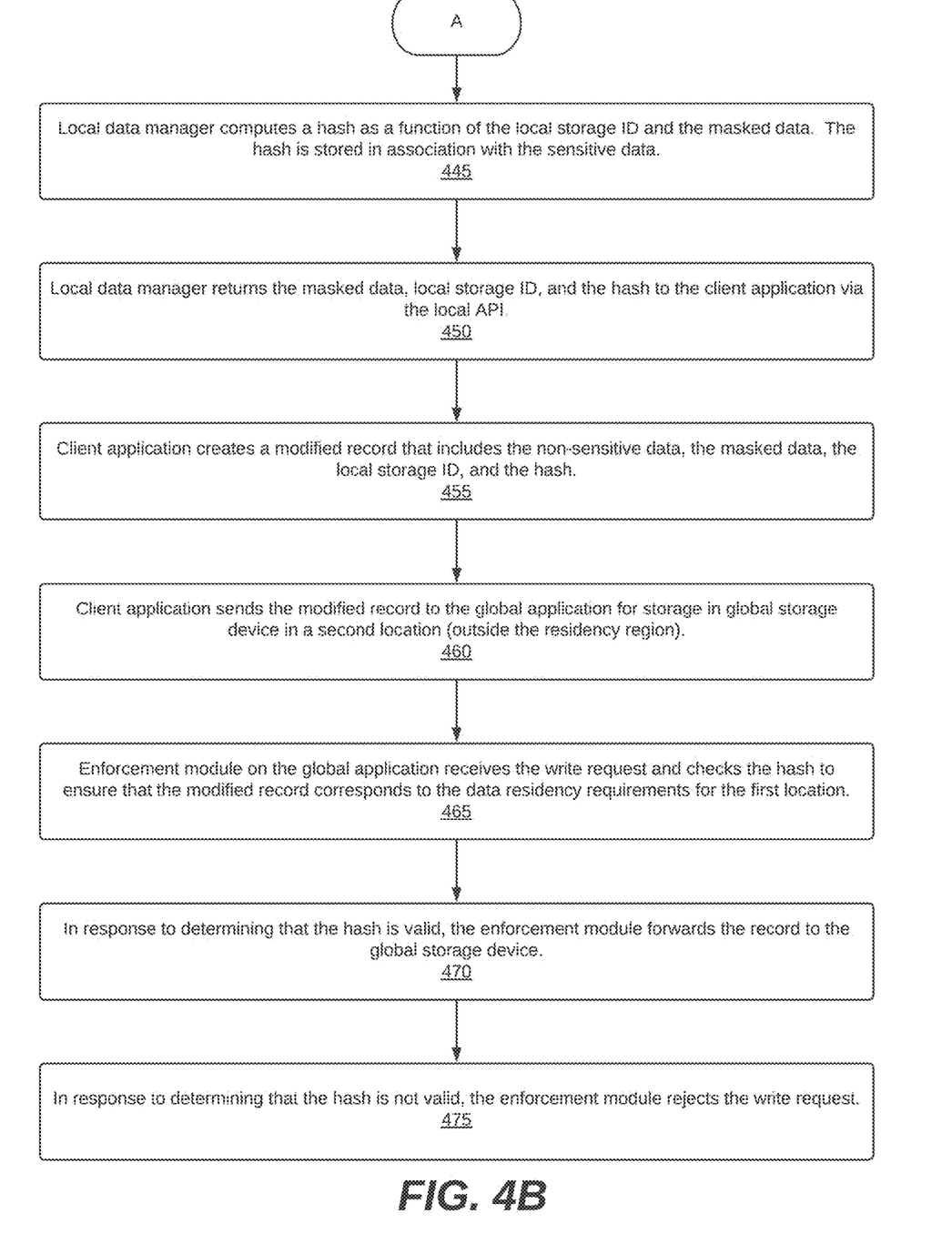

FIGS. 3 and 4A-4B illustrate an example write process for compliance with data residency requirements according to one embodiment. The client application 205 in a first location receives a write request for a record from a user (step 410). The client application 205 initiates the write process by sending user identification information, such as user profile information, to a local API 215 in a first location (step 415). From the user identification information as well as the IP address of the client application 205, the local API 215 determines if the user is subject to local data residency requirements. If so, the local API 215 notifies the client application 205 that the user is subject to local data residency requirements. In response to receiving such notification, the client application 205 retrieves the data residency policy definition for the local region in which the user resides. In certain embodiments, it retrieves the data residency policy definition from its local cache or from a call to the local API 215. (Any changes to the data residency policy definition may be pushed to the client application 205 and the local API 215 from the policy manager 280.)

The local API 215 sends data residency scoping information to the client application 205 (step 420). Based on the scoping information, the client application 205 determines that the record includes one or more fields subject to a data residency requirement ("sensitive data"), as well as fields not subject to a data residency requirement ("non-sensitive data") (step 425). The client application 205 sends a write request for the sensitive data to a local data manager 220 in the first location via the local API 215 (step 430). The local data manager 220 creates a local storage ID for the record 235 and stores the sensitive data 230 in local storage 220 (step 435). The local data manager 220 creates masked data 255 corresponding to the sensitive data 230 (step 440).

The local data manager 220 computes a hash 225 for the record 235 as a function of the local storage ID for the sensitive data 230 and the masked data 255 (step 445). The hash 225 is stored in association with the sensitive data 230. The local data manager 220 returns the masked data 255, local storage ID, and the hash 225 to the client application 205 via the local API 215 (step 450). The client application 205 creates a modified record 270 that includes the non-sensitive data 260, the masked data 255, the local storage ID, and the hash 225 (step 455). The client application 205 sends the modified record 270 to the global application 245 for storage in the global storage device 275 in a second location (outside the residency region) (step 460). The enforcement module 240 on the global application 245 receives the write request and checks the hash 225 to ensure that the modified record 270 corresponds to the data residency requirements for the first location (step 465). In response to determining that the hash 225 is valid, the enforcement module 240 forwards the modified record 270 to the global storage device 275 for storage (step 470). In response to determining that the hash 225 is not valid, the enforcement module 240 rejects the write request (step 475).

In certain embodiments, determining whether the modified record 270 complies with the data residency requirements of the first location includes computing a second hash at the enforcement module 240 that is a function of the local storage ID and the masked data 255 in the modified record 270, where the second hash is computed using the same hash function used to compute the first hash 225. The system determines whether the first hash 225 in the modified record 270 matches the second hash computed by the enforcement module 240. In response to the first hash 225 matching the second hash, the system determines that the modified record 270 complies with the data residency requirements of the first location and enables storage of the non-sensitive data 260 and masked data 255 in the global storage device 275. In response to the first hash 225 not matching the second hash, the system determines that the modified record 270 does not comply with the data residency requirements of the first location and rejects the write request.

4. Example Read Process for Compliance with Data Residency Requirements

Figure 5:
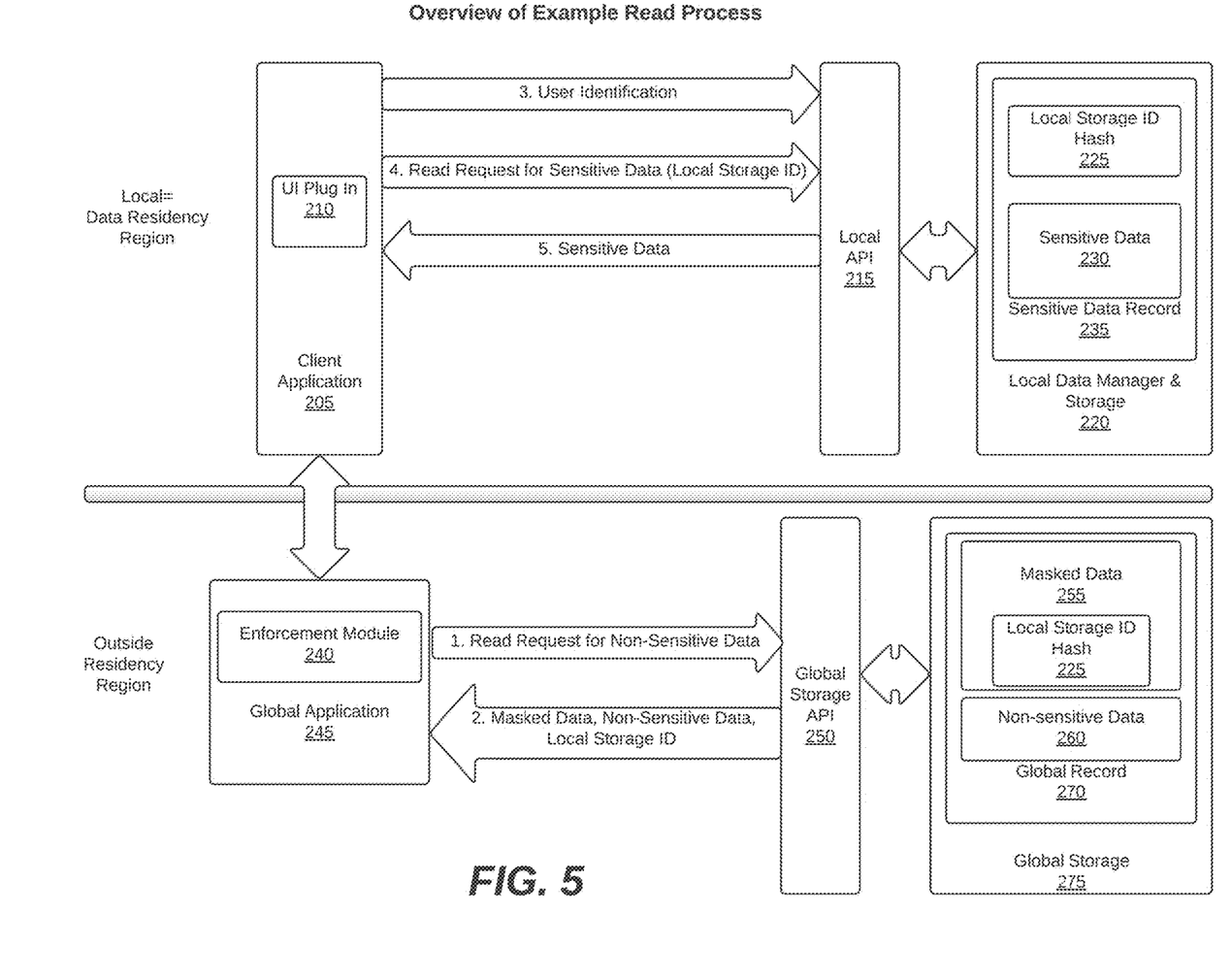
FIG. 5 is a block diagram that illustrates an overview of an example read process according to one embodiment.
Figure 6A:
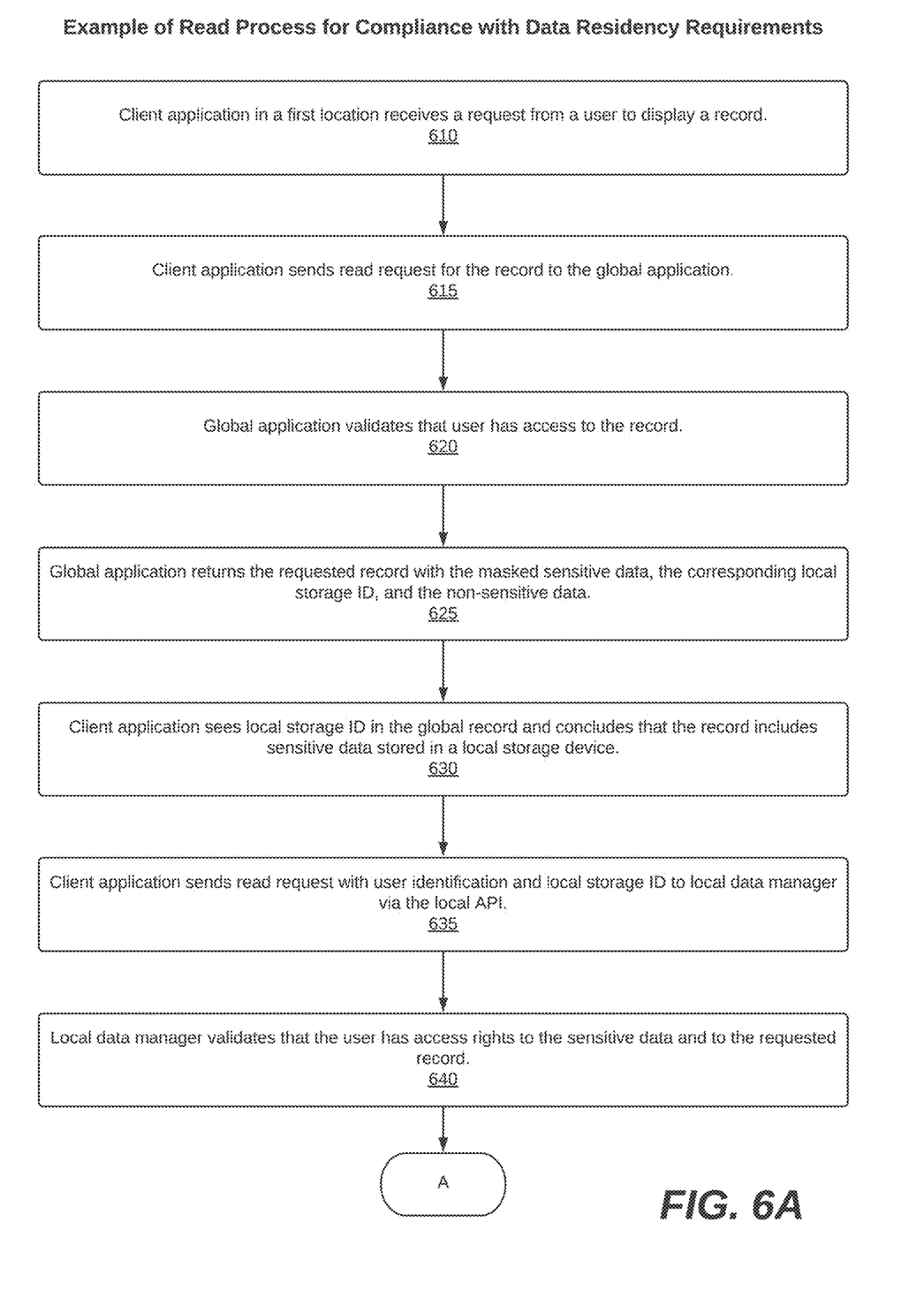
FIGS. 6A-6B are flowcharts that illustrate a method, according to one embodiment, for performing the example read process of FIG. 5 for compliance with data residency requirements.
Figure 6B:
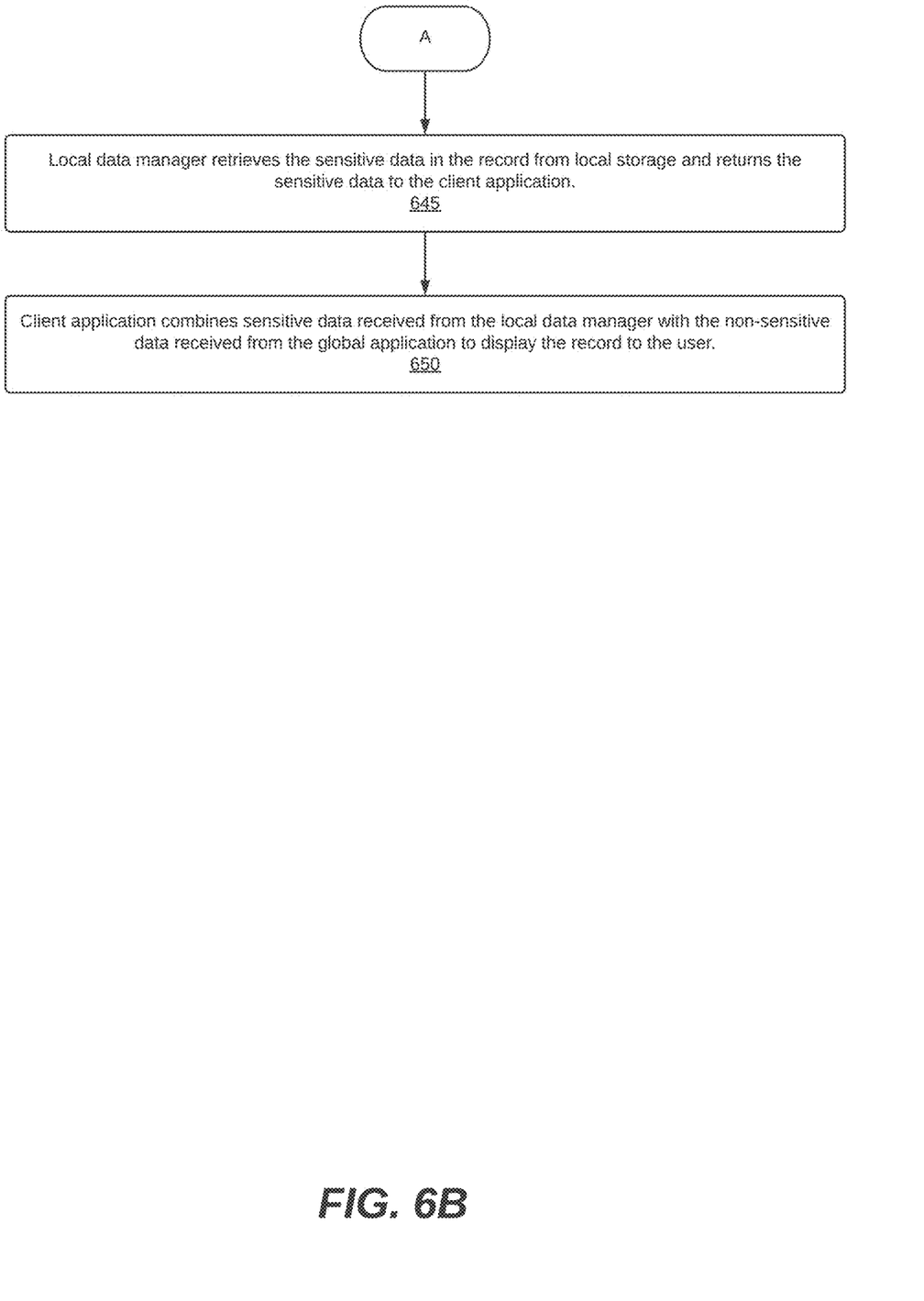

FIGS. 5 and 6A-6B illustrate an example read process for compliance with data residency requirements according to one embodiment. The client application 205 in a first location receives a request from a user to display a record 270 (step 610). The client application 205 sends a read request for the record 270 to the global application 245 (step 615). The global application 245 validates that the user has access to the record 270 (step 620). The global application 245 returns the requested (modified) record 270 with the masked (sensitive) data 255, the corresponding local storage ID, and the non-sensitive data 260 from the global storage device 275 in the second location outside the data residency requirements (step 625). The client application 205 sees the local storage ID in the global record 270 and concludes that the record 270 includes sensitive data 230 stored in a local storage device 220 (step 630). The client application 205 sends a read request with user identification and local storage ID to the local data manager 220 via the local API 215 (step 635).

The local data manager 220 validates that the user has access rights to the sensitive data 230 and to the requested record 235 (step 640). As discussed previously, access control for records 235 may be delegated to the global application 245 or handled by the local data manager 220. In embodiments where access control is delegated to the global application 245, the read request includes an authorization token for the user that specifies the user's access permissions. In embodiments where access control is delegated to the local data manager 220, step 640 includes the local data manager 220 executing access rules (configured via the policy manager 280) to determine if the user has access to the requested record 235. In addition to FIGS. 5 and 6A-6B, this also applies to FIGS. 7 and 8A-8B, as a search for records involves determining to which records 235 a user has access.

The local data manager 220 retrieves the sensitive data 230 in the record 235 from local storage 220 and returns the sensitive data 230 to the client application 205 (step 645). The client application 205 combines sensitive data 230 received from the local data manager 220 with the non-sensitive data 260 received from the global application 245 to display the record 270 to the user (step 650). In certain embodiments, the record 270 is displayed by replacing the masked data 255 with the sensitive data 230, by displaying the masked data 255 and the sensitive data 230 side-by-side, or by displaying the sensitive data 230 in response to an input device to the client application 205 hovering over the masked data 255.

5. Example Search Process for Compliance with Data Residency Requirements

Figure 7:
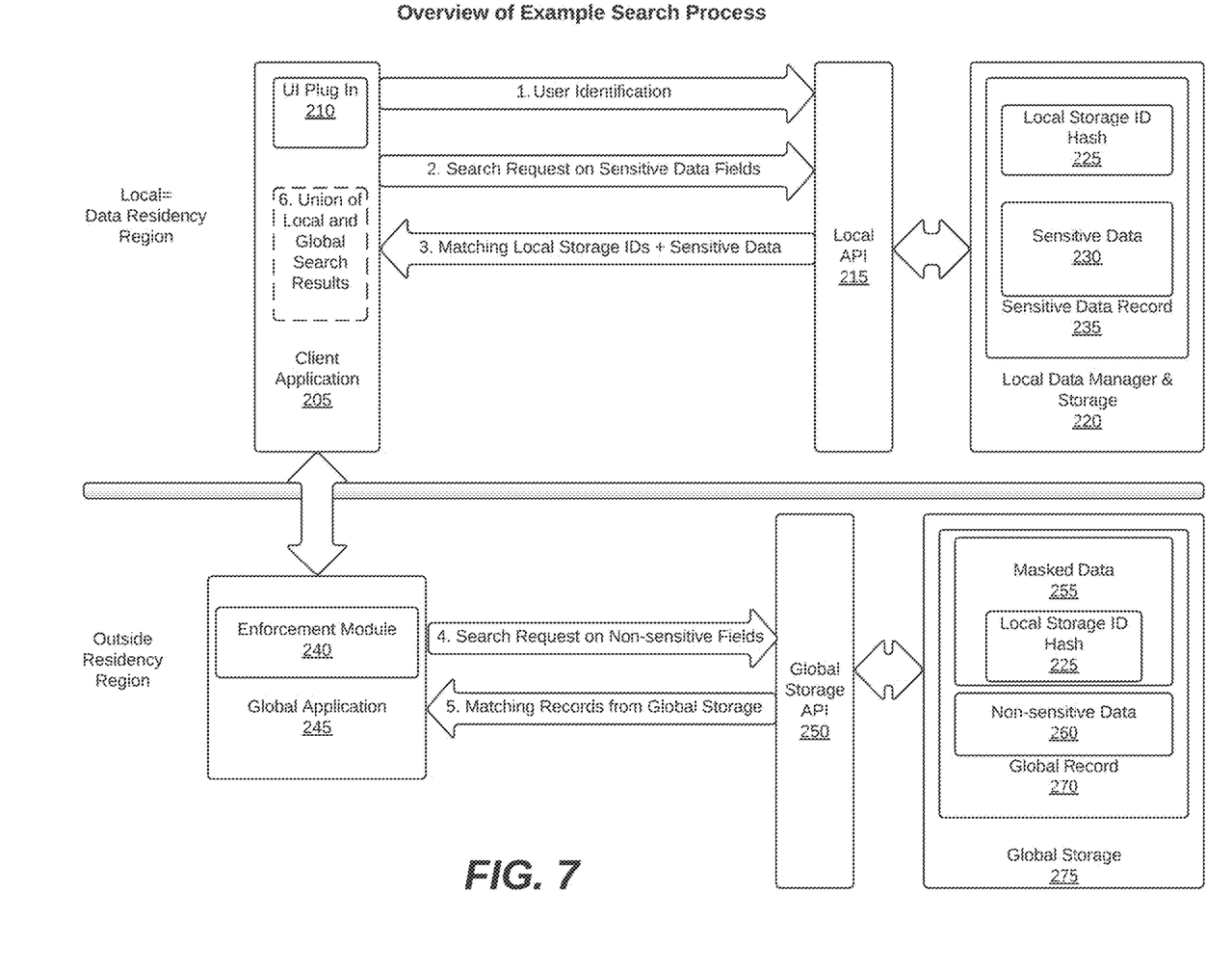
FIG. 7 is a block diagram that illustrates an overview of an example search process according to one embodiment.
Figure 8A:
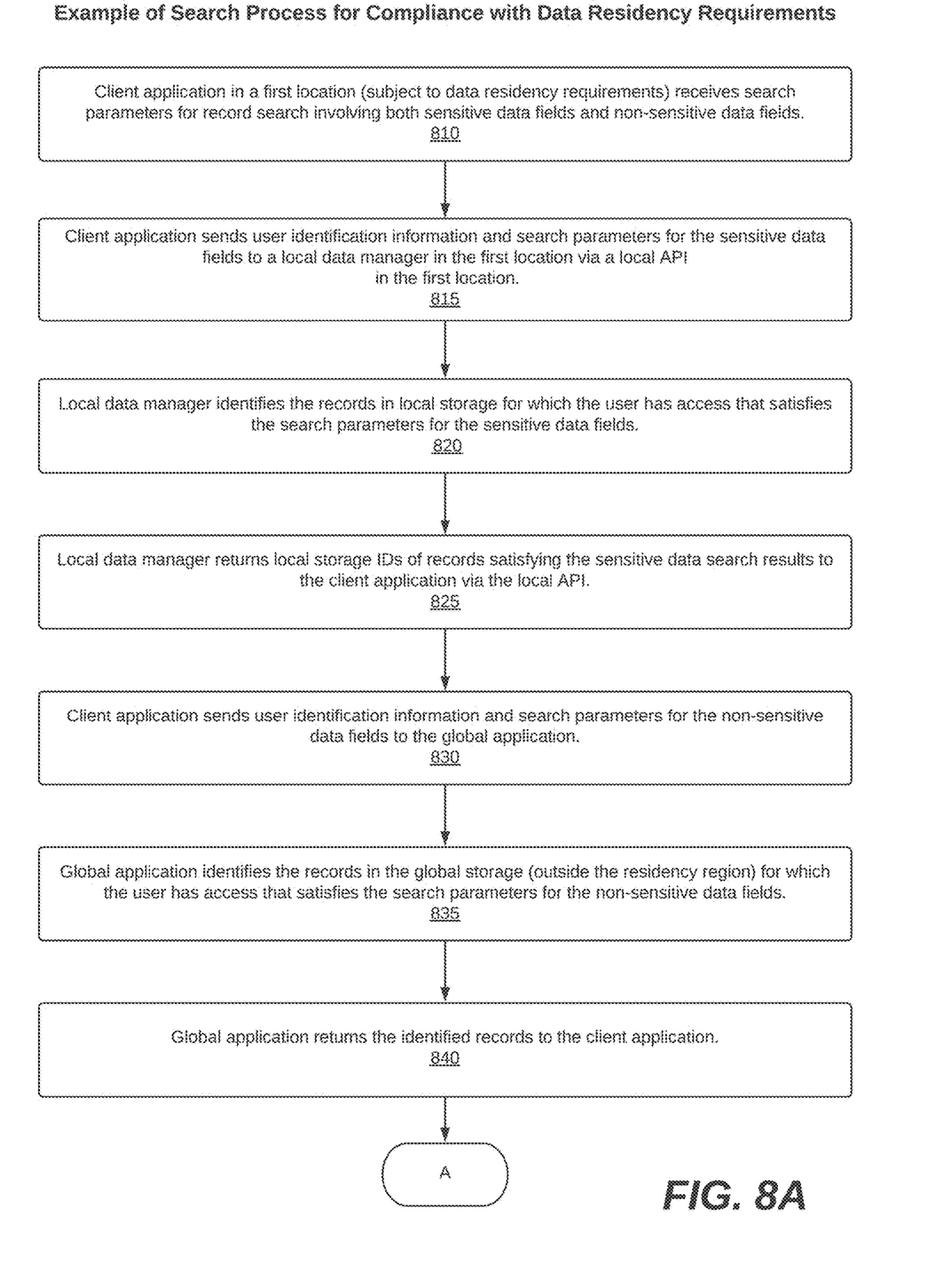
FIGS. 8A-8B are flowcharts that illustrate a method, according to one embodiment, for performing the example search process of FIG. 7 for compliance with data residency requirements.
Figure 8B:
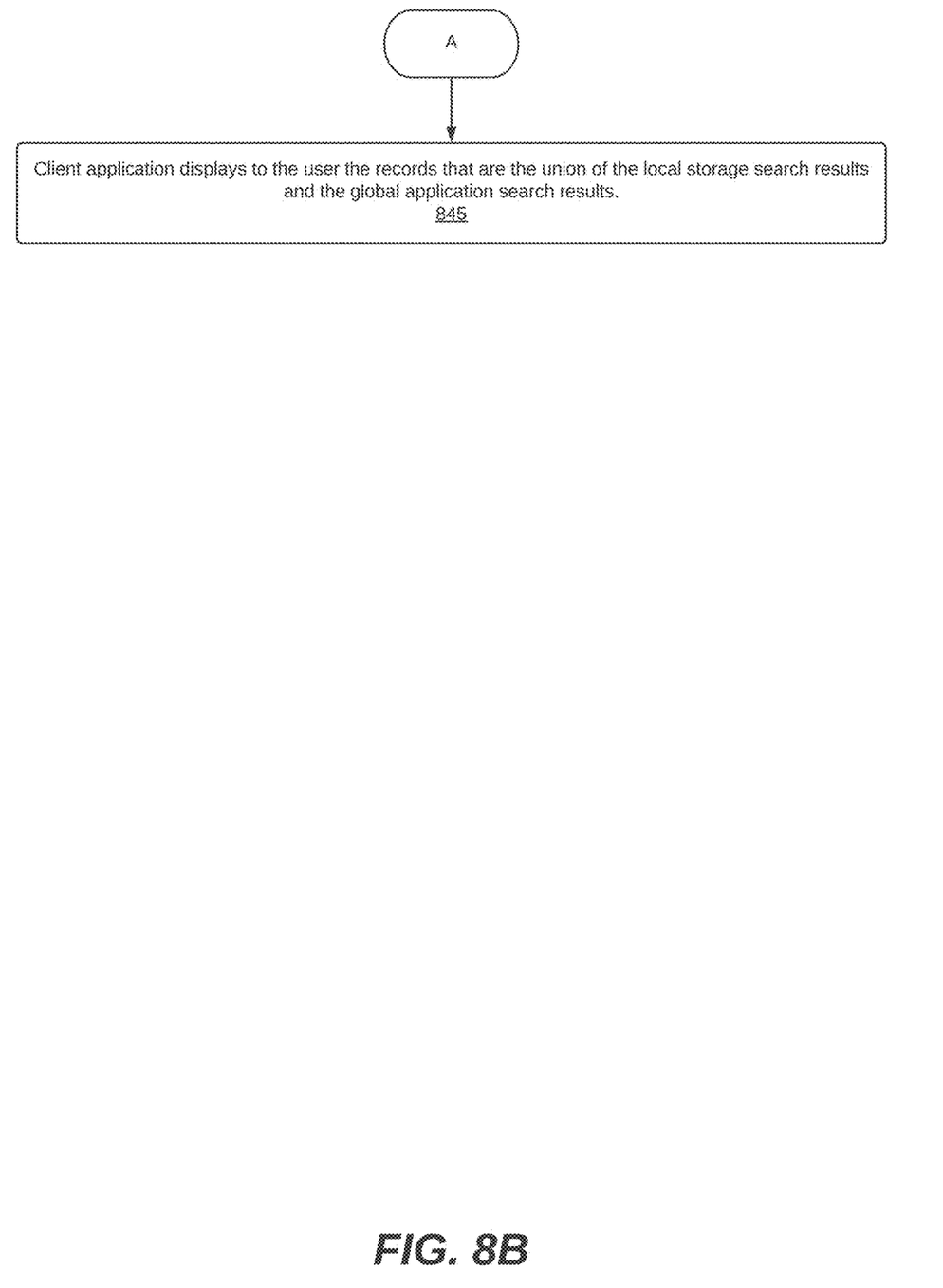

FIGS. 7 and 8A-8B illustrate an example search process for compliance with data residency requirements according to one embodiment. The client application 205 in a first location (subject to data residency requirements) receives search parameters for a record search from a user involving both sensitive data fields and non-sensitive data fields (step 810). The client application 205 sends user identification information and search parameters for the sensitive data fields to a local data manager 220 in the first location via a local API 215 in the first location (step 815). The local data manager 220 identifies the records 235 in local storage 220 for which the user has access that satisfies the search parameters for the sensitive data fields (step 820). The local data manager 220 returns local storage IDs of records 235 satisfying the sensitive data search results to the client application 205 via the local API 215 (step 825). The client application 205 sends a search request including user identification information and search parameters for the non-sensitive data fields to the global application 245 (step 830). The global application 245 identifies the records 270 in the global storage 275 (outside the residency region) for which the user has access that satisfies the search parameters for the non-sensitive data fields (step 835). The global application 245 returns the identified records 270 to the client application 205 (step 840). The client application 205 displays to the user the records that are the union of the local storage search results and the global application search results (step 845).

6. General

The methods described with respect to FIGS. 1-8B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for managing sensitive local data for a global application in compliance with local data residency requirements, the method comprising:
  performing the following in a first location having data residency requirements:
    receiving a write request for a record from a user via a client application in the first location;
    determining on the client application that the record includes both sensitive data that is subject to the data residency requirements and non-sensitive data;
    storing the sensitive data in a local storage device within the first location, wherein the sensitive data is associated with a local storage ID;
    creating masked data corresponding to the sensitive data;
    computing a first hash for the record that is a function of the local storage ID for the sensitive data and the masked data;
    creating a modified record that includes the masked data in place of the sensitive data, the local storage ID of the sensitive data, the first hash, and the non-sensitive data;
    sending the modified record including the first hash to a global application for storage in a global storage device in a second location outside the data residency requirements;
  performing the following in the second location:
    receiving the write request for the modified record at an enforcement module on the global application;
    determining at the enforcement module whether the modified record complies with the data residency requirements of the first location, wherein determining whether the modified record complies with the data residency requirements of the first location comprises:
      computing a second hash at the enforcement module that is a function of the local storage ID and the masked data in the modified record, wherein the second hash is computed using the same hash function used to compute the first hash,
      determining whether the first hash in the modified record matches the second hash computed by the enforcement module,
      in response to the first hash matching the second hash, determining that the modified record complies with the data residency requirements of the first location, and
      in response to the first hash not matching the second hash, determining that the modified record does not comply with the data residency requirements of the first location;
    in response to determining that the modified record complies with the data residency requirements of the first location, sending the modified record to a global storage device for storage; and
    in response to determining that the record does not comply with the data residency requirements of the first location, rejecting the write request.

2. The method of claim 1, further comprising:
  receiving a read request for the record from a user via a client application in the first location;

sending a read request for the record from the client application to the global application;
receiving the modified record from the global application, wherein the global application retrieved the modified record from the global storage device in the second location outside the data residency requirements;
reading at the client application the local storage ID from the modified record;
determining in the first location that the user is within the first location and has access rights to the record and the sensitive data within the record;
retrieving the sensitive data for the record from the local storage device within the first location;
providing the sensitive data for the record to the client application in the first location;
displaying the record at the client application in the first location by combining the sensitive data retrieved from local storage device with the non-sensitive data retrieved from the global storage device.

3. The method of claim 2, wherein displaying the record at the client application comprises one of the following:
(1) replacing the masked data with the sensitive data;
(2) displaying the masked data and the sensitive data side-by-side; or
(3) displaying the sensitive data in response to an input device to the client application hovering over the masked data.

4. The method of claim 1, further comprising:
receiving search parameters for a record search from a user via a client application in the first location, wherein the search parameters include both non-sensitive data fields and sensitive data fields subject to data residency requirements within the first location;
obtaining local storage search results by identifying one or more records in the local storage device in the first location that satisfies the search parameters for the sensitive data fields and to which the user has access;
sending a search request from the client application to the global application in the second location with the search parameters for the non-sensitive data fields;
receiving at the client application global storage search results, wherein the global storage search results are the records in the global storage device in the second location that satisfy the search parameters for the non-sensitive data fields and to which the user has access; and
displaying at the client device the records that are the union of the records identified at the local storage device and the records identified at the global storage device as the results of the user's record search.

5. A non-transitory computer-readable medium comprising a computer program, that, when executed by a computer system, enables the computer system to perform the following steps for managing sensitive local data for a global application in compliance with local data residency requirements, the steps comprising:
performing the following in a first location having data residency requirements:
receiving a write request for a record from a user via a client application in the first location;
determining on the client application that the record includes both sensitive data that is subject to the data residency requirements and non-sensitive data;
storing the sensitive data in a local storage device within the first location, wherein the sensitive data is associated with a local storage ID;
creating masked data corresponding to the sensitive data;
computing a first hash for the record that is a function of the local storage ID for the sensitive data and the masked data;
creating a modified record that includes the masked data in place of the sensitive data, the local storage ID of the sensitive data, the first hash, and the non-sensitive data;
sending the modified record including the first hash to a global application for storage in a global storage device in a second location outside the data residency requirements;
performing the following in the second location:
receiving the write request for the modified record at an enforcement module on the global application;
determining at the enforcement module whether the modified record complies with the data residency requirements of the first location, wherein determining whether the modified record complies with the data residency requirements of the first location comprises:
computing a second hash at the enforcement module that is a function of the local storage ID and the masked data in the modified record, wherein the second hash is computed using the same hash function used to compute the first hash,
determining whether the first hash in the modified record matches the second hash computed by the enforcement module,
in response to the first hash matching the second hash, determining that the modified record complies with the data residency requirements of the first location, and
in response to the first hash not matching the second hash determining that the modified record does not comply with the data residency requirements of the first location;
in response to determining that the modified record complies with the data residency requirements of the first location, sending the modified record to a global storage device for storage; and
in response to determining that the record does not comply with the data residency requirements of the first location, rejecting the write request.

6. The non-transitory computer-readable medium of claim 5, further comprising:
receiving a read request for the record from a user via a client application in the first location;
sending a read request for the record from the client application to the global application;
receiving the modified record from the global application, wherein the global application retrieved the modified record from the global storage device in the second location outside the data residency requirements;
reading at the client application the local storage ID from the modified record;
determining in the first location that the user is within the first location and has access rights to the record and the sensitive data within the record;
retrieving the sensitive data for the record from the local storage device within the first location;
providing the sensitive data for the record to the client application in the first location;
displaying the record at the client application in the first location by combining the sensitive data retrieved from local storage device with the non-sensitive data retrieved from the global storage device.

7. The non-transitory computer-readable medium of claim 6, wherein displaying the record at the client application comprises one of the following:
(1) replacing the masked data with the sensitive data;
(2) displaying the masked data and the sensitive data side-by-side; or
(3) displaying the sensitive data in response to an input device to the client application hovering over the masked data.

8. The non-transitory computer-readable medium of claim 5, further comprising:
receiving search parameters for a record search from a user via a client application in the first location, wherein the search parameters include both non-sensitive data fields and sensitive data fields subject to data residency requirements within the first location;
obtaining local storage search results by identifying one or more records in the local storage device in the first location that satisfies the search parameters for the sensitive data fields and to which the user has access;
sending a search request from the client application to the global application in the second location with the search parameters for the non-sensitive data fields;
receiving at the client application global storage search results, wherein the global storage search results are the records in the global storage device in the second location that satisfy the search parameters for the non-sensitive data fields and to which the user has access; and
displaying at the client device the records that are the union of the records identified at the local storage device and the records identified at the global storage device as the results of the user's record search.

9. A system for reading, writing, and querying records of a global application in compliance with data residency requirements for a first location, wherein the global application stores records in a global storage device outside the first location, the system comprising:
a local data manager within the first location for enabling storing sensitive data within a local storage device in the first location and for creating a masked version of sensitive data;
a user interface module executing within a client application for the global application, wherein the client application is within the first location and wherein the user interface module determines whether read, write, and search requests received at the client application include sensitive data subject to data residency requirements for the first location;
a local application program interface module within the first location for enabling communications between the user interface module and the local data manager; and
an enforcement module executing on the global application outside the first location for ensuring that write requests received from client applications within the first location comply with the data residency requirements of the first location;
wherein:
to store a record with both sensitive data and non-sensitive data, the client application module first sends a write request to the local data manager to store the sensitive data in the local storage device in the first location;
in response to a receiving a write request for a record with sensitive data and non-sensitive data, the user interface module initiates the storage of the sensitive data in the local storage device within the first location by the local data manager creating a masked version of the sensitive data, computing a first hash that is a function of a local storage ID for the sensitive data and the masked data, and storing the sensitive data in the local storage device in association with the first hash and the local storage ID;
the local data manager returns the first hash, the local storage ID, and the masked version of the sensitive data to the client application module;
the client application module sends a write request to the global application to store the masked data and the non-sensitive data in the global storage device outside the first location, wherein the write request includes the first hash and the local storage ID of the corresponding sensitive data;
the enforcement module receives the write request at the global application and computes a second hash that is a function of the local storage ID and the masked data, wherein the first and second hashes are computed using the same hash function;
the enforcement module ensures compliance with the data residency requirements by determining whether the first and second hashes are the same;
in response to the first and second hashes being the same, the enforcement module enables the non-sensitive data and masked data to be stored in the global storage device;
in response to the first and second hashes being different, the enforcement module rejects the write request;
in response to receiving a read request for a record with sensitive data and non-sensitive data, the user interface module initiates the retrieval of non-sensitive data from the global storage device and the retrieval of sensitive data from the local storage device; and
in response to a search request involving both sensitive data fields and non-sensitive data fields, the user interface module obtains search results for the sensitive data fields from the local data manager and obtain search results for the non-sensitive data fields from the global application and displays the union of the search results.

10. The system of claim 9, further comprising:
a compliance reporting module executing on a computer within the first location for monitoring compliance with the data residency requirement; and
a data residency policy manager executing on a server for enabling an administrator to define a data residency scope, wherein the data residency policy manager communicates policy definitions to the enforcement module executing on the global application, the local application programming interface, and the local data manager.

* * * * *